United States Patent
Kagawa et al.

(10) Patent No.: US 6,947,661 B2
(45) Date of Patent: Sep. 20, 2005

(54) APPARATUS AND METHOD FOR REPRODUCING VIDEO SIGNALS

(75) Inventors: Takashi Kagawa, Saitama (JP); Koji Inoue, Chiba (JP)

(73) Assignee: Sony Corporation, Tokyo (JP)

( * ) Notice: Subject to any disclaimer, the term of this patent is extended or adjusted under 35 U.S.C. 154(b) by 1074 days.

(21) Appl. No.: 09/748,897

(22) Filed: Dec. 27, 2000

(65) Prior Publication Data
US 2001/0006576 A1 Jul. 5, 2001

(30) Foreign Application Priority Data
Dec. 28, 1999 (JP) .......................................... 11-375012

(51) Int. Cl.⁷ ............................................. H04N 5/911
(52) U.S. Cl. ...................... 386/113; 386/114; 386/125; 348/607; 348/622; 348/701
(58) Field of Search ............................ 386/21, 46, 114, 386/113, 125–126; 348/606, 607, 610, 620, 622, 625, 627, 700, 701

(56) References Cited

U.S. PATENT DOCUMENTS

| | | | | |
|---|---|---|---|---|
| 4,074,231 A | * | 2/1978 | Yajima et al. | ............... 348/625 |
| 5,241,372 A | * | 8/1993 | Ohba | ......................... 348/700 |
| 5,519,453 A | | 5/1996 | Wischermann | |
| 5,751,888 A | | 5/1998 | Fukuchi et al. | |
| 5,825,418 A | * | 10/1998 | Song et al. | ................. 348/718 |
| 5,867,625 A | | 2/1999 | McLaren | |
| 5,943,096 A | | 8/1999 | Choo | |
| 6,282,243 B1 | * | 8/2001 | Kazui et al. | ............. 348/416.1 |
| 2003/0193584 A1 | * | 10/2003 | Malkin et al. | .............. 348/252 |

FOREIGN PATENT DOCUMENTS

| | | |
|---|---|---|
| EP | 0 868 076 | 9/1998 |
| GB | 2 202 706 | 9/1988 |
| WO | WO 97 40623 | 10/1997 |
| WO | WO 99 57906 | 11/1999 |

* cited by examiner

*Primary Examiner*—Vincent Boccio
(74) *Attorney, Agent, or Firm*—Frommer Lawrence & Haug LLP; William S. Frommer; Darren M. Simon

(57) ABSTRACT

To eliminate unnaturalness in the display of video signals that are intermittently updated. Video signals recorded in a disk 1 in a compressed manner are reproduced through a pickup 2. The reproduced signals are fed to a reproduction processing unit 3 from where a bit stream is fetched which is then fed to a decoder circuit 4. The decoder circuit 4 produces video signals reconstructed from the compression. The signals from the decoder circuit 4 are fed to an adder 12 which is an adder means through an amplifier 11 which is a weighting circuit having a coefficient of, for example, 0.5. The added signal from the adder 12 is fetched to an output terminal 13, and is fed to a frame memory 14 which is a storage means of, for example, one frame. The signal stored in the frame memory 14 is fed to an adder 12 through an amplifier 15 which is a second weighting circuit having a coefficient of, for example, 0.5.

10 Claims, 4 Drawing Sheets

APPARATUS AND METHOD FOR REPRODUCING VIDEO SIGNALS

BACKGROUND OF THE INVENTION

1. Field of the Invention

The present invention relates to apparatus and method for reproducing video signals that is suited for decoding and reproducing video signals that are recorded being compressed by, for example, a moving picture coding experts group (hereinafter abbreviated as MPEG) system. More specifically, the invention is for favorably reproducing and displaying the video signals in reproducing the recording medium recorded by the MPEG system at the time of a high-speed search, etc.

2. Description of the Related Art

In an apparatus and method for reproducing video signals by decoding and reproducing the video signals that are recorded in a compressed manner by, for example, the MPEG system, it is an accepted practice to decode a frame called I-frame that is provided, for example, every after 15 frames of video signals and that can be decoded by itself. By using the thus decoded I-frame, frames called P- and B-frames formed by the differences among the frames are decoded to reproduce all frames forming the video signals.

When the recording medium recorded by the MPEG system is to be reproduced by a time series such as a high-speed search which is different from that of during the recording, the I-frames that can be decoded by themselves only are decoded successively to form video signals. That is, when, for example, the I-frame is provided every after 15 frames as described above, the I-frames only are reproduced in the high-speed search at a speed 15 times as fast.

In practice, however, a time is required for detecting the I-frames based upon the addresses added to the frames, and only, for example, about 3 to 5 frames can be reproduced in a second. In the conventional device, therefore, the video signals have been intermittently updated and fetched in a unit of a frame for every predetermined period of time by repeating the preceding frame in a period in which, for example, 3 to 5 frames are reproduced in a second.

According to the above method of intermittently updating and fetching the video signals in a unit of a frame for every predetermined period of time, however, the video signals that are displayed produce a very unnatural display. That is, when, for example, 5 frames are displayed a second at a speed of 15 times as fast, the frames that are displayed are each every after 90 frames. Therefore, the interval among the frames that are displayed is three seconds in the standard time of reproduction, which is longer than an interval of, for example, 0.5 seconds in the analog-type VTR, and becomes unnatural.

Further, when, for example, 5 frames are displayed a second, the time for displaying each frame is 0.2 seconds, which is long enough for the viewer to perceive the picture of each frame to a sufficient degree. Therefore, the display in which the thus perceived picture is intermittently updated appears very unnatural to the viewer compared with the display in which the pictures that cannot be fully perceived appear continuously such as in the high-speed search of the existing analog VTR.

SUMMARY OF THE INVENTION

The present application was accomplished in view of the above-mentioned points, and the problem that must be solved is that in the method of intermittently updating and fetching the video signals in a unit of a frame for every predetermined period of time as done in the conventional device, the video signals that are displayed produce a very unnatural display.

DESCRIPTION OF THE PREFERRED EMBODIMENTS

According to the present invention, therefore, the video signals are gradually replaced for the signals that are intermittently updated and fetched in a unit of a frame for every predetermined period of time and output. Then, the picture that is displayed changes continuously to eliminate the problem of unnaturalness in the display.

That is, the present invention is concerned with an apparatus and method for reproducing video signals having a function for decoding and reproducing video signals that are recorded in a compressed manner, and for intermittently updating and fetching the decoded video signals for every predetermined period of time in a unit of a frame, said device comprising storage means for storing one or plural frames of the video signals, plural weighting means for multiplying said fetched video signals and/or the video signals stored in said storage means by their respective coefficients, and ladder means for adding up the output signals of said plural weighting means, wherein said fetched video signals are gradually replaced and are output.

Figure 1:
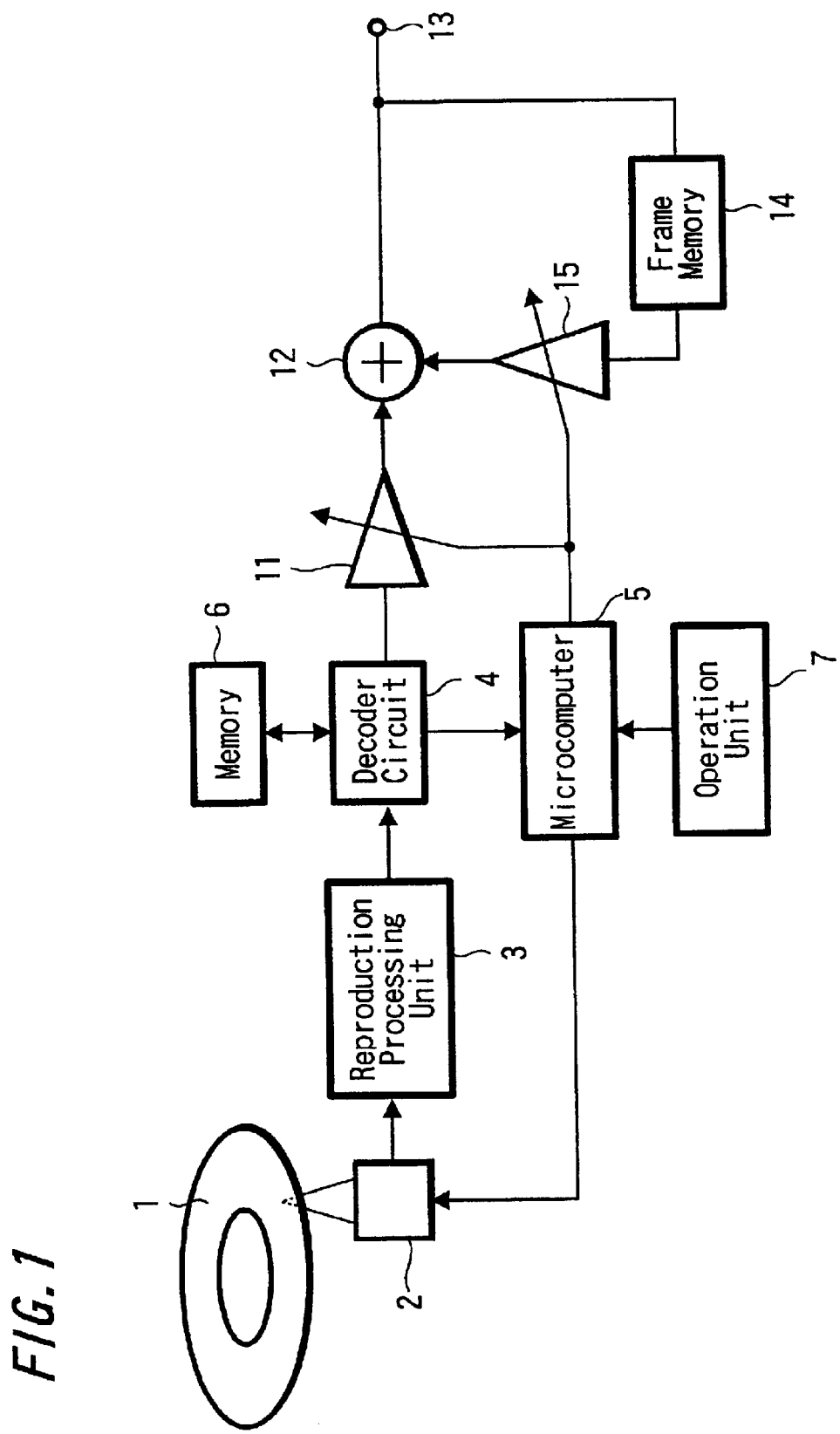
FIG. 1 is a diagram illustrating the constitution of an embodiment of an apparatus and method for reproducing video signals according to the present invention.

The invention will now be described with reference to the drawings. FIG. 1 is a block diagram illustrating the constitution of an embodiment of an apparatus and method for reproducing video signals to which the present invention is applied. In the embodiment of FIG. 1, the video signals compressed by, for example, the MPEG system have been recorded in a disk-like recording medium. The invention, however, can be applied to any compression system, and the recording medium is in no way limited to the disk but may be in any other form such as tape or the like.

In FIG. 1, in a disk 1 are recorded video signals that are compressed by, for example, the MPEG system. The video signals recorded in the disk 1 in a compressed manner are reproduced through a pickup 2. The signals reproduced through the pickup 2 are fed to a reproduction processing unit 3 from where a bit stream of, for example, the MPEG system is fetched and is fed to a decoder circuit 4 of, for example, the MPEG system. Thus, video signals reconstructed from the compression are output from the decoder circuit 4.

In the decoder circuit 4, a frame called I-frame is decoded out of the video signals that are compressed by, for example, the MPEG system, the I-frame being provided every after, for example, 15 frames and being allowed to be decoded by itself. By using the thus decoded I-frame, the frames called P- and B-frames formed by the differences among the frames are decoded. Thus, all frames forming the video signals are reconstructed to reproduce the video signals.

By using the device, further, when the signals are to be reproduced by a time series like that of, for example, during the high-speed search which is different from that of during the recording, the I-frames that can be decoded by themselves only are successively decoded to form the video signals. Accordingly, when the I-frame is provided after, for example, every 15 frames of the video signals, the reproduction is effected during the high-speed search at a speed 15 times as fast since the I-frames only are reproduced. Here, however, it is not allowed to detect and decode the I-frame for every frame as described above.

When 5 frames are displayed a second at a speed of, for example, 15 times as fast as described above, the frames that are displayed are each every after 90 frames. That is, the address of the I-frame discriminated by the decoder circuit 4 is fed to the microcomputer 5 for control, and the microcomputer 5 calculates the address of the I-frame that is to be reproduced next from the above-mentioned value of a multiplicity of speed and the number of the frames displayed in a second. Then, the pickup 2 is so controlled as to be brought to the address.

The decoder circuit 4 includes a memory 6 in which are stored I-frames related to the signals being reproduced. Accordingly, when the operation is changed over to the high-speed search during, for example, the reproducing operation, the signals of I-frames stored in the memory 6 are, first, output, and the pickup 2 is controlled to be sent to an address of, for example, 90 frames thereafter. Further, the microcomputer 5 is provided with an operation unit 7 for controlling the reproduction and stop and for setting the value of a multiplicity of speed during the high-speed search.

Thus, the video signal of the I-frame is fetched from the decoder circuit 4, for example, every after 90 frames. In this case, the time of about a 6-frame period is required for fetching the signal of the I-frame after, for example, 90 frames and, during this period, the signal of the preceding I-frame is output repetitively. Thus, from the decoder circuit 4 is output a video signal in which each of the decoded I-frames are intermittently updated and extracted by the frame unit during every predetermined period of time.

In this device, the signals from the decoder circuit 4 are fed to an adder 12 which is adder means through an amplifier 11 which is a first weighting circuit having a coefficient of, for example, 0.5. The added signal from the adder 12 is fetched to an output terminal 13 and is fed to a frame memory 14 which is means for storing, for example, one frame. Further, the signal stored in the frame memory 14 is fed to the adder 12 through an amplifier 15 which is a second weighting circuit having a coefficient of, for example, 0.5.

In this device, therefore, so far as the signal of the same frame is repetitively output, the amplifiers 11 and 15 feed the same signal to the adder 12, and the signal of the same frame is output to the output terminal 13. When the signal from the decoder circuit 4 is updated, on the other hand, the first frame produces a signal formed by adding the preceding frame and the updated frame at a ratio of 0.5:0.5, and the next frame produces a signal formed by adding the preceding frame and the updated frame at a ratio of 0.25:0.75.

Further, a next frame produces a signal formed by adding the preceding frame and the updated frame at a ratio of 0.125:0.875, the preceding frame and the updated frame thus being gradually replaced. It would appear that the preceding frame remains forever. In practice, however, the effect of the preceding frame becomes smaller than a detectable limit after about 3 to 4 frames, and the preceding frame is replaced by the updated frame. This operation is repeated every time when the signal from the decoder circuit 4 is updated.

According to this device as described above, a video signal for which the preceding frame and the updated frame are gradually replaced is output to the output terminal 13 every time when the I-frame decoded by the decoder circuit 4 is updated. Therefore, the viewer sees the frames that change continuously, i.e., sees the display that changes continuously like during the high-speed search using the conventional analog VTR, giving natural feeling to the viewer.

Therefore, a feedback-type circuit comprising storage means, weighting means and adder means is used for the video signals that are intermittently updated and fetched in a unit of a frame for every predetermined period of time, in order to gradually replace the video signals. Accordingly, the displayed picture changes continuously eliminating unnaturalness in the display.

In the reproduction method of intermittently updating and fetching the video signals in a unit of a frame for every predetermined period of time by using the conventional device, the video signals that are displayed become very unnatural. The present invention easily solves the above problem.

When the amplifiers 11 and 15 both effect the weighting with a coefficient of 0.5 in the above-mentioned constitution, the replacement is effected after about 3 to 4 frames. This is a value suited for when the signals are updated every after 6 frames on a display of, for example, 5 frames a second. When the value of the multiplicity of speed is increased to 30 times as fast or 150 times as fast, however, an extended period of time is required before feeting the pickup 2 to the next address, and the signal is often updated, for example, every after 10 frames on a display of 3 frames a second.

The above-mentioned replacement after 3 to 4 frames for the updating of, for example, every 10 frames, may not be enough for eliminating the intermittent display causing the display to appear unnatural. By effecting the weighting through the amplifier 11 by a coefficient of 0.25 and the weighting through the amplifier 15 by a coefficient of 0.75, on the other hand, the ratio of the preceding frame and the updated frame becomes 0.75:0.25 in the first frame, and becomes 0.5625:0.4375 in the next frame, thus lengthening the time for the replacement.

With the replacement being effected over an extended period of time, however, the effect of the two frames before remains at the time of updating when the updating is effected in a short time interval, and the display becomes rather unnatural. In view of this point according to the above-mentioned device, the coefficients for the weighting through the amplifiers 11 and 15 are controlled by a microcomputer 5 which is control means, and the time for the replacement is controlled depending upon the frequency for updating the frames.

That is, in the above-mentioned device, the frequency for updating the frame to be displayed has been determined in advance depending, for example, upon the value of the multiplicity of speeds of the high-speed search. Therefore, the microcomputer 5 is allowed to know in advance the frequency for updating the frames displayed relying on a value of the multiplicity of speed set through the operation unit 7. The coefficients of weighting through the amplifiers 11 and 15 are controlled by the value that is set in advance depending upon the frequency, and the time required for the replacement is controlled depending upon the frequency for updating the frames.

In the above-mentioned device, therefore, a microcomputer is provided as control means for controlling the coefficient of the weighting means, and the time required for replacing the fetched video signals is controlled depending, for example, upon the frequency for updating the frames, making it possible not to cause unnatural feeling in the display irrespective of a change in the frequency for updating the frames.

Figure 2:
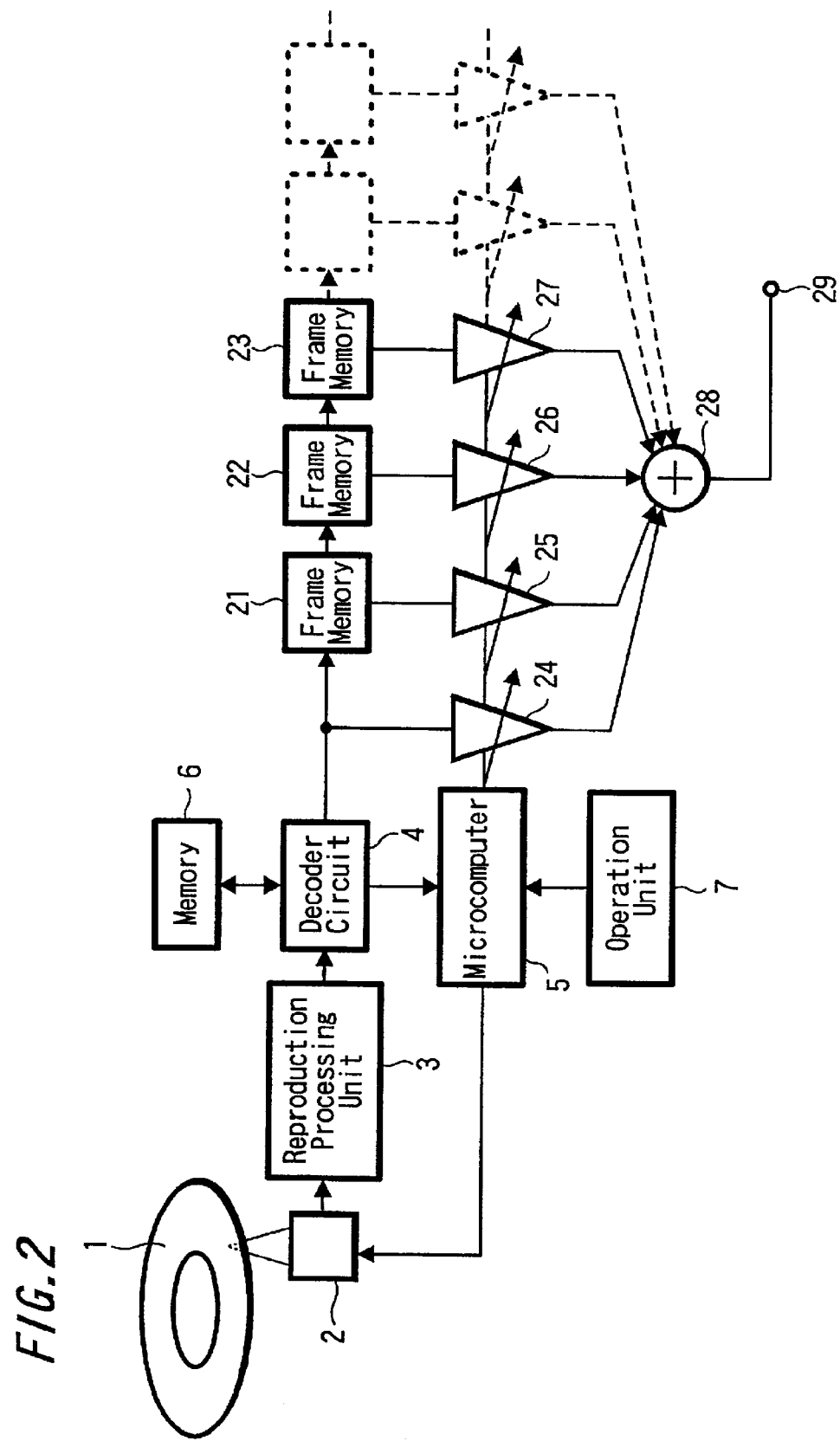
FIG. 2 is a diagram illustrating the constitution of another embodiment of the device for reproducing video signals according to the present invention.

FIG. 2 is a block diagram of a constitution of another embodiment of the device for reproducing video signals to which the present invention is applied. The embodiment of FIG. 2 deals with a case where the video signals compressed by, for example, the MPEG system are recorded in a disk-like recording medium. The invention, however, can be applied to any compression system. Further, the recording medium can be the one of any other form such as a tape or the like not being limited to the disk only.

In FIG. 2, in a disk 1 are recorded video signals that are compressed by, for example, the MPEG system. The video signals recorded in the disk 1 in a compressed manner are reproduced through a pickup 2. The signals reproduced through the pickup 2 are fed to a reproduction processing unit 3 from where a bit stream of, for example, the MPEG system is fetched and is fed to a decoder circuit 4 of, for example, the MPEG system. Thus, video signals reconstructed from the compressed signals are output from the decoder circuit 4.

In the decoder circuit 4, a frame called I-frame is decoded out of the video signals that are compressed by, for example, the MPEG system, the I-frame being provided every after, for example, 15 frames and being allowed to be decoded by itself. By using the thus decoded I-frame, the frames called P- and B-frames formed by the differences among the frames are decoded. Thus, all frames forming the video signals are reconstructed to reproduce the video signals.

By using the device, further, when the signals are to be reproduced by a time series like that of, for example, during the high-speed search which is different from that of during the recording, the I-frames that can be decoded by themselves only are successively decoded to form the video signals. Accordingly, when the I-frame is provided after, for example, every 15 frames of the video signals, the reproduction is effected during the high-speed search at a speed 15 times as fast since the I-frames only are reproduced. Here, however, it is not allowed to detect and decode the I-frame for every frame as described above.

When 5 frames are displayed a second at a speed of, for example, 15 times as fast as described above, the frames that are displayed are each every after 90 frames. That is, the address of the I-frame discriminated by the decoder circuit 4 is fed to the microcomputer 5 for control, and the microcomputer 5 calculates the address of the I-frame that is to be reproduced next from the above-mentioned value of a multiplicity of speed and the number of the frames displayed in a second. Then, the pickup 2 is so controlled as to be brought to the address.

The decoder circuit 4 includes a memory 6 in which are stored I-frames related to the signals being reproduced. Accordingly, when the operation is changed over to the high-speed search during, for example, the reproducing operation, the signals of I-frames stored in the memory 6 are, first, output, and the pickup 2 is controlled to be sent to an address of, for example, 90 frames thereafter. Further, the microcomputer 5 is provided with an operation unit 7 for controlling the reproduction and stop and for setting the value of a multiplicity of speed during the high-speed search.

Thus, the video signal of the I-frame is fetched from the decoder circuit 4, for example, every after 90 frames. In this case, the time of about a 6-frame period is required for fetching the signal of the I-frame after, for example, 90 frames and, during this period, the signal of the preceding I-frame is output repetitively. Thus, from the decoder circuit 4 is output a video signal in which each of the decoded I-frames are intermittently updated and extracted by the frame unit during every predetermined period of time.

In this device, signals from the decoder circuit 4 are fed to three frame memories 21, 22 and 23 connected in cascade, and signals of the frames which are successively fed are stored therein. Further, the signals from the decoder circuit 4 and the signals stored in the frame memories 21, 22 and 23 are fed to an adder 28 which is adder means through amplifiers 24, 25, 26 and 27 that are weighting circuits having a coefficient of 0.25, respectively. The signal added through the adder 28 is fetched through an output terminal 29.

In this device, therefore, so far as the signal of the same frame is repetitively output, the amplifiers 24 through 27 feed the same signal to the adder 28, and the signal of the same frame is output to the output terminal 29. When the signal from the decoder circuit 4 is updated, on the other hand, the first frame produces a signal formed by adding the preceding frame and the updated frame at a ratio of 0.75:0.25, and the next frame produces a signal formed by adding the preceding frame and the updated frame at a ratio of 0.5:0.5.

Further, a next frame produces a signal formed by adding the preceding frame and the updated frame at a ratio of 0.25:0.75. The next frame produces the updated frame only, thus the preceding frame and the updated frame being gradually replaced. That is, in this device, the frame is replaced by the updated frame after four frames. This operation is repeated every time when the signal from the decoder circuit 4 is updated.

According to this device as described above, a video signal for which the preceding frame and the updated frame are gradually replaced is output to the output terminal 29 every time when the I-frame decoded by the decoder circuit 4 is updated. Therefore, the viewer sees the frames that change continuously, i.e., sees the display that changes continuously like during the high-speed search using the conventional analog VTR, giving natural feeling to the viewer.

In this device, therefore, a non-feedback-type circuit comprising storage means, weighting means and adder means is used for the video signals that are intermittently updated and fetched in a unit of a frame for every predetermined period of time, in order to gradually replace the video signals. Accordingly, the displayed picture changes continuously eliminating unnaturalness in the display.

In the reproduction method of intermittently updating and fetching the video signals in a unit of a frame for every predetermined period of time by using the conventional device, the video signals that are displayed become very unnatural. The present invention easily solves the above problem.

When the amplifiers 24–27 effect the weighting with a coefficient of 0.25 by using the frame memories 21 to 23, in the above-mentioned constitution, the replacement is effected after 4 frames. This is a value suited for when the signals are updated every after 6 frames on a display of, for example, 5 frames a second. When the value of the multiplicity of speed is increased to 30 times as fast or 150 times as fast, however, an extended period of time is required before feeding the pickup 2 to the next address, and the signal is often updated, for example, every after 10 frames on a display of 3 frames a second.

The above-mentioned replacement after 4 frames for the updating of, for example, every 10 frames, may not be enough for eliminating the intermittent display causing the display to appear unnatural. By increasing the number of frame memories as indicated by broken lines in the drawing and by effecting the weighting through the amplifiers having a small coefficient, on the other hand, the time for the replacement can be lengthened. That is, the time for the replacement can be lengthened to 7 frames by using, for example, 8 frame memories and setting the coefficients of the 8 amplifiers to be 0.125, respectively.

With the replacement being effected over an extended period of time, however, the effect of the two frames before remains at the time of updating when the updating is effected in a short time interval, and the display becomes rather unnatural. In view of this point according to the above-mentioned device, the number of the frame memories is increased, coefficients for the weighting through the amplifiers are controlled by the microcomputer 5 which is control means, and the time for the replacement is controlled depending upon the frequency for updating the frames.

That is, in the above-mentioned device, the frequency for updating the frame to be displayed has been determined in advance depending, for example, upon the value of the multiplicity of speeds of the high-speed search. Therefore, the microcomputer 5 is allowed to know in advance the frequency for updating the frames displayed relying on a value of the multiplicity of speed set through the operation unit 7. The number of the frame memories and the coefficients of weighting through the amplifiers are controlled depending upon the frequency, and the time required for the replacement is controlled depending upon the frequency for updating the frames.

In the above-mentioned embodiment, the frame memories are connected in cascade. The invention, however, can also be realized by providing a memory control device which selects the memories that provided in parallel to successively store the signals therein. Further, if the values of weighting coefficients through the amplifiers can be controlled for every frame period, the signal of the preceding frame may be stored in a frame memory, and the signals from the frame memory and the decoder circuit may be added and replaced while controlling the weighting coefficients of the two amplifiers.

In the above-mentioned device, therefore, a microcomputer is provided as control means for controlling the coefficient of the weighting means, and the time required for replacing the fetched video signals is controlled depending, for example, upon the frequency for updating the frames, making it possible not to cause unnatural feeling in the display irrespective of a change in the frequency for updating the frames.

Figure 3:
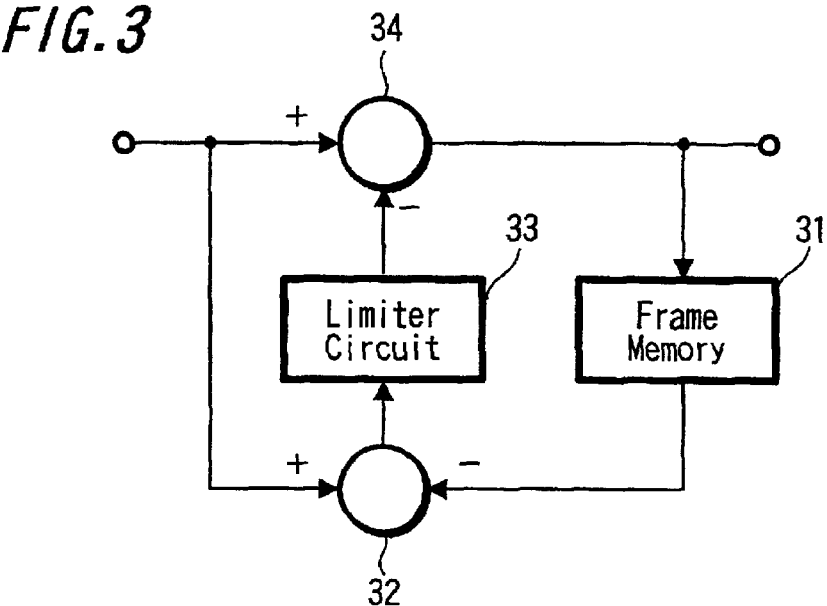
FIG. 3 is a diagram illustrating the constitution of a noise-reducing circuit.

FIG. 3 illustrates the constitution of a noise-reducing circuit for reducing noise by detecting a differential signal between the preceding frame and the succeeding frame by using a frame memory 31 and a subtracter 32, limiting the differential signal to a suitable level through a limiter circuit 33, and subtracting it from the initial signal through a subtracter 34. The noise-reducing circuit is provided in, for example, a subsequent stage of the decoder circuit 4 and is used only during the normal reproduction but is not necessary in, for example, the above-mentioned high-speed searching operation.

Figure 4:
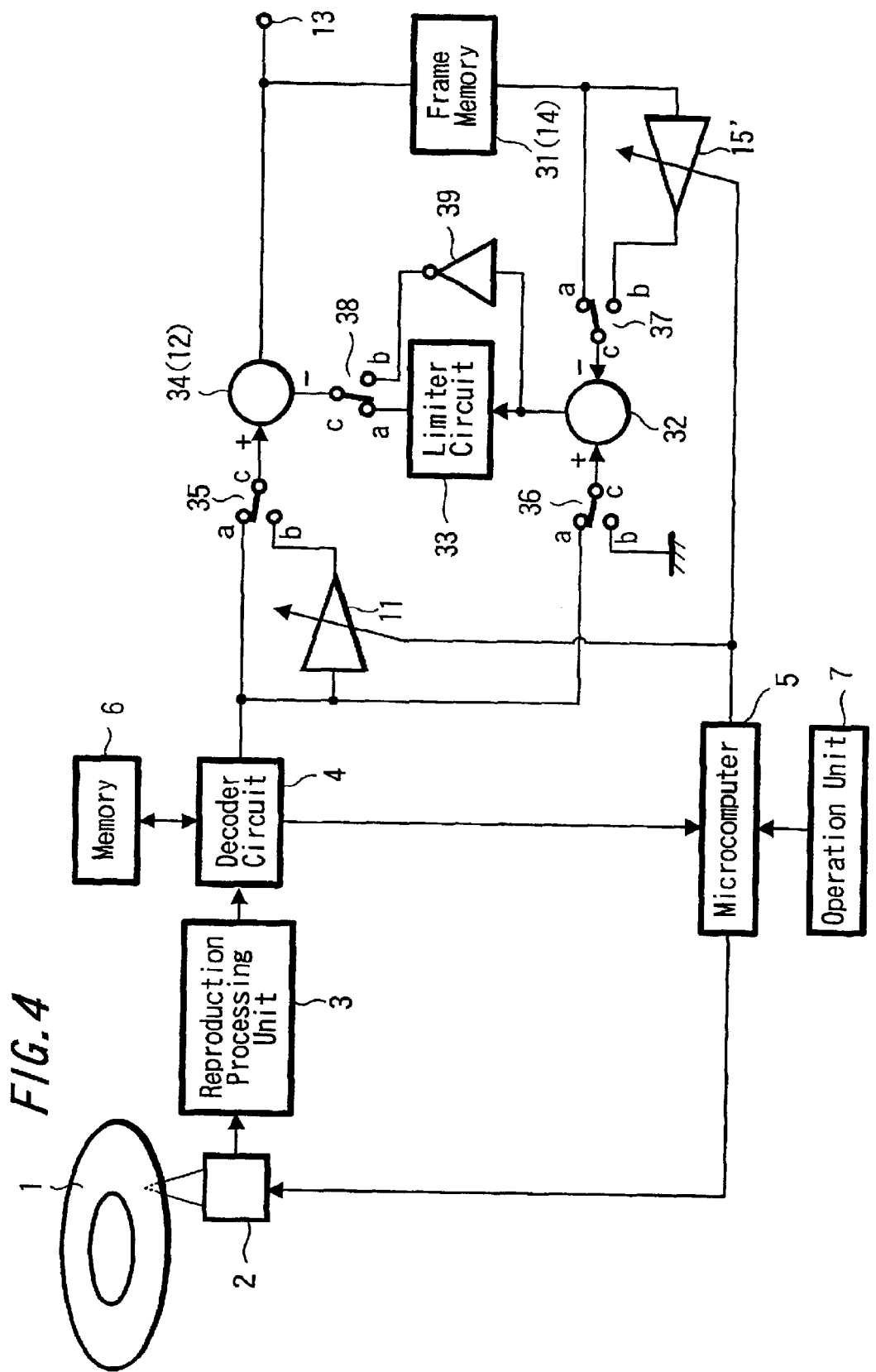
FIG. 4 is a diagram illustrating the constitution of a further embodiment of the device for reproducing video signals according to the present invention.

FIG. 4 illustrates a device which is so formed as to overcome the unnatural display by gradually replacing the video signals by utilizing the frame memory 31 provided in the noise-reducing circuit. In the embodiment of FIG. 4, the video signals compressed by, for example, the MPEG system have been recorded in a disk-like recording medium. The invention, however, can be applied to any compression system, and the recording medium is in no way limited to the disk but may be in any other form such as tape or the like.

In FIG. 4, in a disk 1 are recorded video signals that are compressed by, for example, the MPEG system. The video signals recorded in the disk 1 in a compressed manner are reproduced through a pickup 2. The signals reproduced through the pickup 2 are fed to a reproduction processing unit 3 from where a bit stream of, for example, the MPEG system is fetched and is fed to a decoder circuit 4 of, for example, the MPEG system. Thus, video signals reconstructed from the compressed signals are output from the decoder circuit 4.

In the decoder circuit 4, a frame called I-frame is decoded out of the video signals that are compressed by, for example, the MPEG system, the I-frame being provided every after, for example, 15 frames and being allowed to be decoded by itself. By using the thus decoded I-frame, the frames called P- and B-frames formed by the differences among the frames are decoded. Thus, all frames forming the video signals are reconstructed to reproduce the video signals.

By using the device, further, when the signals are to be reproduced by a time series like that of, for example, during the high-speed search which is different from that of during the recording, the I-frames that can be decoded by themselves only are successively decoded to form the video signals. Accordingly, when the I-frame is provided after, for example, every 15 frames of the video signals, the reproduction is effected during the high-speed search at a speed 15 times as fast since the I-frames only are reproduced. Here, however, it is not allowed to detect and decode the I-frame for every frame as described above.

When 5 frames are displayed a second at a speed of, for example, 15 times as fast as described above, the frames that are displayed are each every after 90 frames. That is, the address of the I-frame discriminated by the decoder circuit 4 is fed to the microcomputer 5 for control, and the microcomputer 5 calculates the address of the I-frame that is to be reproduced next from the above-mentioned value of a multiplicity of speed and the number of the frames displayed in a second. Then, the pickup 2 is so controlled as to be brought to the address.

The decoder circuit 4 includes a memory 6 in which are stored I-frames related to the signals being reproduced. Accordingly, when the operation is changed over to the high-speed search during, for example, the reproducing operation, the signals of I-frames stored in the memory 6 are, first, output, and the pickup 2 is controlled to be sent to an address of, for example, 90 frames thereafter. Further, the microcomputer 5 is provided with an operation unit 7 for controlling the reproduction and stop and for setting the value of a multiplicity of speed during the high-speed search.

Thus, the video signal of the I-frame is fetched from the decoder circuit 4, for example, every after 90 frames. In this case, the time of about a 6-frame period is required for fetching the signal of the I-frame after, for example, 90 frames and, during this period, the signal of the preceding I-frame is output repetitively. Thus, from the decoder circuit 4 is output a video signal in which each of the decoded I-frames are intermittently updated and extracted by the frame unit during every predetermined period of time.

In this device, the output of the decoder circuit 4 is fed to one fixed contact of a switch 35 and is further fed to the other fixed contact b of the switch 35 through an amplifier 11. Further, a signal from a moving contact c of the switch 35 is fed to a to-be-subtracted input of a subtracter 34. The output of the subtractor 34 is fed to an output terminal 13 and is further fed to a frame memory 31 that also serves as a frame memory 14. Reference numerals are in common for those used in FIGS. 1 and 3 above.

Further, the output of the decoder circuit 4 is fed to a fixed contact of a switch 36, and the other fixed contact b of the switch 36 is grounded. A signal from the moving contact c of the switch 36 is fed to a to-be-subtracted input of a subtracter 32. Further, the output of the frame memory 31 is fed to a fixed contact point a of a switch 37 and is further fed to the other fixed contact b of the switch 37 through an inverting amplifier 15' that corresponds to the amplifier 15.

A signal from a moving contact c of the switch 37 is fed to a subtraction input of the subtracter 32, and the output of the subtracter 32 is fed to a limiter circuit 33. Further, the output of the limiter circuit 33 is fed to a fixed contact a of a switch 38, and the output of the subtracter 32 is fed to the other fixed contact b of the switch 38 through an inverter 39. A signal from a moving contact c of the switch 38 is fed to the substraction input of the subtracter 34.

In a state where the switches 35 to 38 are all connected to the fixed contacts a in this device, a noise-reducing circuit is constituted in the same manner as in FIG. 3 described above. That is, in this device, a differential signal between the preceding frame and the succeeding frame is detected by using the frame memory 31 and the subtracter 32. The differential signal is limited to a suitable level through the limiter circuit 33 and is subtracted from the initial signal through the subtracter 34. Thus, there is formed a noise-reducing circuit for reducing noise.

When the switches 35 to 38 are all connected to the fixed contacts b, on the other hand, the to-be-subtracted input of the subtracter 32 is grounded, and a signal is fed to the subtraction input through the inverting amplifier 15'; i.e., the signal just passes through the inverting amplifier 15'. The subtractor 34 executes the addition as a signal is fed to the subtraction input thereof through the inverter 39. That is, in this device, the switches 35 to 38 are all connected to the fixed contacts b to establish the same circuit constitution as that of FIG. 1 described above.

In this device, therefore, while the signal of the same frame is being repetitively output, the same signals from the amplifiers 11, 15' are added through the subtracter 34, and the signal of the same frame is output to the output terminal 13. When the signal from the decoder circuit 4 is updated, on the other hand, the first frame produces a signal formed by adding the preceding frame and the updated frame at a ratio of 0.5:0.5, and the next frame produces a signal formed by adding the preceding frame and the updated frame at a ratio of 0.25:0.75.

Further, a next frame produces a signal formed by adding the preceding frame and the updated frame at a ratio of 0.125:0.875, the preceding frame and the updated frame thus being gradually replaced. It would appear that the preceding frame remains forever. In practice, however, the effect of the preceding frame becomes smaller than a detectable limit after about 3 to 4 frames, and the preceding frame is replaced by the updated frame. This operation is repeated every time when the signal from the decoder circuit 4 is updated.

According to this device as described above, a video signal for which the preceding frame and the updated frame are gradually replaced is output to the output terminal 13 every time when the I-frame decoded by the decoder circuit 4 is updated. Therefore, the viewer sees the frames that change continuously, i.e., sees the display that changes continuously like during the high-speed search using the conventional analog VTR, giving natural feeling to the viewer.

In this device, therefore, the video signals are gradually replaced and output for the signals that are intermittently updated and fetched in a unit of a frame for every predetermined predetermined period of time. Accordingly, the displayed picture changes continuously eliminating unnaturalness in the display.

In the reproduction method of intermittently updating and fetching the video signals in a unit of a frame for every predetermined period of time by using the conventional device, the video signals that are displayed become very unnatural. The present invention easily solves the above problem.

By using this device, the present invention is put into practice with a simple constitution without providing a new frame memory by utilizing a frame memory provided in the noise-reducing circuit that is not necessary in the high-speed search operation and by forming a device that gradually replaces the above-mentioned video signals.

When the amplifiers 11 and 15' both effects the weighting with a coefficient of 0.5 in the above-mentioned constitution, the replacement is effected after about 3 to 4 frames. This is a value suited for when the signals are updated every after 6 frames on a display of, for example, 5 frames a second. When the value of the multiplicity of speed is increased to 30 times as fast or 150 times as fast, however, an extended period of time is required before feeding the pickup 2 to the next address, and the signal often is updated, for example, every after 10 frames on a display of 3 frames a second.

The above-mentioned replacement after 3 to 4 frames for the updating of, for example, every 10 frames, may not be enough for eliminating the intermittent display causing the display to appear unnatural. By effecting the weighting through the amplifier 11 having a coefficient of 0.25 and the weighting through the amplifier 15' having a coefficient of 0.75, on the other hand, the ratio of the preceding frame and the updated frame becomes 0.75:0.25 in the first frame, and becomes 0.5625:0.4375 in the next frame, thus lengthening the time for the replacement.

With the replacement being effected over an extended period of time, however, the effect of the two frames before remains at the time of updating when the updating is effected in a short time interval, and the display becomes rather unnatural. In view of this point according to the above-mentioned device, the coefficients for the weighting through the amplifiers 11 and 15' are controlled by a microcomputer 5 which is control means, and the time for the replacement is controlled depending upon the frequency for updating the frames.

That is, in the above-mentioned device, the frequency for updating the frame to be displayed has been determined in advance depending, for example, upon the value of the multiplicity of speeds of the high-speed search. Therefore, the microcomputer 5 is allowed to know in advance the frequency for updating the frames displayed relying on a value of the multiplicity of speed set through the operation unit 7. The coefficients of weighting through the amplifiers 11 and 15' are controlled by the value that is set in advance depending upon the frequency, and the time required for the replacement is controlled depending upon the frequency for updating the frames.

In the above-mentioned device, therefore, a microcomputer is provided as control means for controlling the coefficient of the weighting means, and the time required for replacing the fetched video signals is controlled depending, for example, upon the frequency for updating the frames, making it possible not to cause unnatural feeling in the display irrespective of a change in the frequency for updating the frames.

Figure 5:
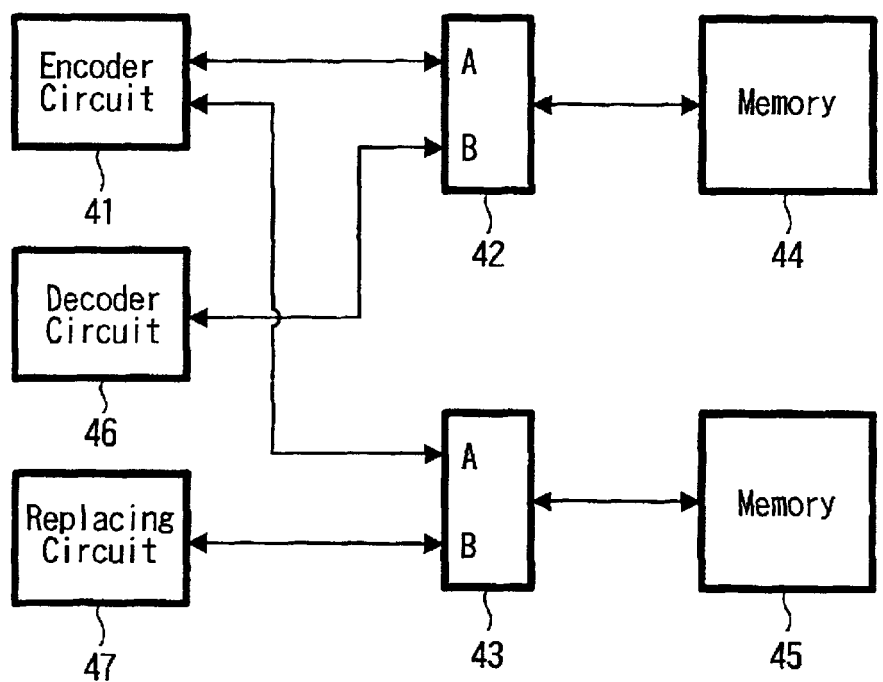
FIG. 5 is a diagram illustrating a case of when the device for reproducing video signals of the present invention is applied to a device having a recording system.

FIG. 5 illustrates an another embodiment when the present invention is applied to an apparatus and method for reproducing video signals having a recording system. When the video signals are to be compressed by, for example, the MPEG system in the recording system, the frame memories are generally needed in a number larger than that of during the reconstruction. At the time of reproduction, therefore, some of the frames provided for the compression are not used. By utilizing such frame memories that are not used, therefore, a device is formed for gradually replacing the above-mentioned video signals.

That is, in FIG. 5, memories 44 and 45 corresponding to the total amount necessary for compressing the video signals are connected, through terminals A of selectors 42 and 43, to an encoder circuit 41 that compresses the video signals. On the other hand, only the memory 44 is connected, through a terminal B of the selector 42, to a decoder circuit 46 that reconstructs the video signals. Then, the remaining memory 45 is connected, through a terminal B of the selector 43, to a replacing circuit 47 that replaces the fetched video signals.

At the time of recording, the selectors 42 and 43 are changed over to the terminals A to connect the memories 44 and 45 to the encoder circuit 41 for executing the compression. At the time of reproduction, the selector 42 is changed over to the terminal B to connect the memory 44 to the decoder circuit 46 to execute the reconstruction and, at the same time, the selector 43 is changed over to the terminal B to connect the memory 45 to the replacing circuit 47. As described above, by utilizing of the frame memory 45 that; has not been used at the time of reproduction, thereby an apparatus device is formed for gradually replacing the above-mentioned video signals.

In this device, therefore, the video signals are gradually replaced and output for the signals that are intermittently updated and fetched in a unit of a frame for every predetermined period of time. Accordingly, the displayed picture changes continuously eliminating unnaturalness in the display.

In the reproduction method of intermittently updating and fetching the video signals in a unit of a frame for every predetermined period of time by using the conventional device, the video signals that are displayed become very unnatural. The present invention easily solves the above problem.

By using this device, the present invention is put into practice with a simple constitution without providing a new frame memory by utilizing a frame memory that is not used during the reproduction and by forming a device that gradually replaces the above-mentioned video signals.

As described above, the invention provides the device for reproducing video signals having a function for decoding and reproducing video signals that are recorded in a compressed manner, and for intermittently updating and fetching the decoded video signals for every predetermined period of time in a unit of a frame, the device comprising storage means for storing one or plural frames of the video signals, plural weighting means for multiplying the fetched video signals and/or the video signals stored in the storage means by their respective coefficients, and adder means for adding up the output signals of the plural weighting means, wherein the fetched video signals are gradually replaced and are output, enabling the displayed picture to continuously change and eliminating unnaturalness in the display.

The above-mentioned frame memory is not limited to the type that stores the signals in a unit of a frame but may be the one of the type that stores the signals in a unit of a field.

The present invention is not limited to the above-mentioned embodiments only but can be modified in a variety of ways without departing from the spirit of the invention.

According to the invention of claim 1, therefore, the video signals are gradually replaced and output for the signals that are intermittently updated and fetched in a unit of a frame for every predetermined period of time. Accordingly, the displayed picture changes continuously eliminating unnaturalness in the display.

In the reproduction method of intermittently updating and fetching the video signals in a unit of a frame for every predetermined period of time by using the conventional device, the video signals that are displayed become very unnatural. The present invention easily solves the above problem.

According to the invention of claim 2, further, provision is made of plural weighting means for multiplying the fetched video signals and the video signals stored in the storage means by their respective coefficients, and a passage for feeding the added signals of the adder means to the storage means and a passage for outputting the added signals of the adder means. Therefore, the video signals are gradually replaced by using a circuit of the feedback type, whereby the displayed picture changes continuously eliminating unnaturalness in the display.

According to the invention of claim 3, further, the storage means successively stores the fetched video signals, and provision is further made of plural weighting means for multiplying the video signals of the plural frames stored in the storage means by their respective coefficients, and a passage for outputting the added signals of the adder means. Therefore, the video signals are gradually replaced by using a circuit of the feedback type, whereby the displayed picture changes continuously eliminating unnaturalness in the display.

According to the invention of claim 4, further, provision is made of control means for controlling the coefficients of the weighting means, and the time for replacing the fetched video signals is controlled, so that there does not occur unnaturalness in the display irrespective of a change in the frequency for updating the frames.

According to the invention of claim 5, further, the storage means stores the video signals in a unit of a frame or in a unit of a field, making it possible to use a frame memory which is not limited to the one of the type for storing the signals in a unit of a frame but also to use a frame memory of the type for storing the signals in a unit of a field.

According to the invention of claim 6, further, provision is made of a noise-reducing circuit for reducing the noise by comparing the frames before and after the video signal, and a storage unit provided in the noise-reducing circuit is used as the storage means, making it possible to implement the invention with a simple constitution without the need of providing new frame memory.

According to the invention of claim 7, further, provision is made of an encoder circuit for compressing the video signals, and a storage unit provided in the encoder circuit is used as the storage means, making it possible to implement the invention with a simple constitution without the need of providing a new frame memory.

According to the invention of claim 8, further, the fetched video signals are gradually replaced and output at the time of reproducing the video signals that are recorded in a compressed manner in a time series different from that of during the recording, enabling the picture intermittently displayed during the high-speed search to change continuously eliminating unnaturalness in the display.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus and method for reproducing video signals having a function for decoding and reproducing video signals that are recorded in a compressed manner, and for intermittently updating and fetching the decoded video signals for every predetermined period of time in a unit of a frame, said device comprising:

storage means for storing one or plural frames of said video signals;

a noise-reducing circuit for reducing noise by comparing the frames before and after the video signal; wherein, a storage unit provided in said noise-reducing circuit is used as said storage means;

plural weighting means for multiplying said fetched video signals and/or the video signals stored in said storage means by their respective coefficients; and adder means for adding up the output signals of said plural weighting means;

wherein said fetched video signals are gradually replaced and are output.

2. An apparatus and method for reproducing video signals according to claim 1, further comprising:

plural weighting means for multiplying said fetched video signals and the video signals stored in said storage means by their respective coefficients; and a passage for feeding the added signals of said adder means to said storage means, and a passage for outputting the added signals of said adder means.

3. An apparatus and method for reproducing video signals according to claim 1, wherein:

said storage means successively stores said fetched video signals;

said device further comprising:

plural weighting means for multiplying the video signals of the plural frames stored in said storage means by their respective coefficients; and a passage for outputting the added signals of said adder means.

4. An apparatus and method for reproducing video signals according to claim 1, further comprising:

control means for controlling the coefficients of said weighting means; wherein, the time for replacing the fetched video signals is controlled.

5. An apparatus and method for reproducing video signals according to claim 1, wherein said storage means stores said video signals in a unit of a frame or in a unit of a field.

6. An apparatus and method for reproducing video signals according to claim 1, further comprising:

an encoder circuit for compressing said video signals; wherein, a storage unit provided in said encoder circuit is used as said storage means.

7. An apparatus and method for reproducing video signals according to claim 1, wherein said fetched video signals are gradually replaced and output at the time of reproducing the video signals in a time series different from that of during the recording, said video signals being recorded in a compressed manner.

8. A method of reproducing video signals having a function for decoding and reproducing video signals that are recorded in a compressed manner, and for intermittently updating and fetching the decoded video signals for every predetermined period of time in a unit of a frame, said method comprising the steps of:

storing one or plural frames of said video signals in a storage means;

reducing noise by a noise-reducing circuit which reduces the noise by comparing the frames before and after the video signal; wherein, a storage unit provided in said noise-reducing circuit is used as said storage means;

effecting the weighting using plural weighting means by multiplying said fetched video signals and/or the video signals stored in said storage means by their respective coefficients;

adding up the output signals of said plural weighting means through adder means; and gradually replacing and outputting said fetched video signals.

9. The method for reproducing video signals according to claim 8, further comprising the step of:

controlling the coefficients of said weighting means by control means; wherein the time for replacing the fetched video signals is controlled.

10. The method for reproducing video signals according to claim 8, wherein said fetched video signals are gradually replaced and output at the time of reproducing the video signals in a time series different from that of during the recording, said video signals being recorded in a compressed manner.

* * * * *